(12) United States Patent
Bartels et al.

(10) Patent No.: US 12,168,751 B2
(45) Date of Patent: Dec. 17, 2024

(54) IMIDAZOLINE-DERIVED COMPOUNDS AND USE AS NATURAL GAS HYDRATE INHIBITORS

(71) Applicant: ChampionX LLC, Sugar Land, TX (US)

(72) Inventors: Jeremy Wayne Bartels, Sugar Land, TX (US); Kousik Kundu, Sugar Land, TX (US); Jeff Michael Servesko, Sugar Land, TX (US)

(73) Assignee: ChampionX LLC, Sugar Land, TX (US)

( * ) Notice: Subject to any disclaimer, the term of this patent is extended or adjusted under 35 U.S.C. 154(b) by 0 days.

(21) Appl. No.: 18/003,035

(22) PCT Filed: Jun. 24, 2021

(86) PCT No.: PCT/US2021/038902
§ 371 (c)(1),
(2) Date: Dec. 22, 2022

(87) PCT Pub. No.: WO2021/262981
PCT Pub. Date: Dec. 30, 2021

(65) Prior Publication Data
US 2023/0250329 A1    Aug. 10, 2023

Related U.S. Application Data

(60) Provisional application No. 63/044,087, filed on Jun. 25, 2020.

(51) Int. Cl.
C09K 8/52     (2006.01)
E21B 37/06    (2006.01)
E21B 43/22    (2006.01)

(52) U.S. Cl.
CPC ............... *C09K 8/52* (2013.01); *E21B 37/06* (2013.01); *C09K 2208/22* (2013.01)

(58) Field of Classification Search
CPC ..... C09K 2208/32; C09K 8/54; E21B 21/068; E21B 21/00; E21B 41/02; E21B 37/06
See application file for complete search history.

(56) References Cited

U.S. PATENT DOCUMENTS

| 2015/0011453 A1 * | 1/2015 | Bennett | C10G 75/02 562/67 |
| 2018/0037804 A1 | 2/2018 | Levey et al. | |
| 2019/0055484 A1 | 2/2019 | Bartels et al. | |

FOREIGN PATENT DOCUMENTS

| CA | 3116322 A1 * | 4/2020 | ............ C09K 8/588 |
| PL | 226810 B1 | 9/2017 | |
| PL | 226811 B1 | 9/2017 | |

OTHER PUBLICATIONS

International Search Report and Written Opinion dated Oct. 8, 2021 relating to PCT/US2021/038902, 14 pages.

* cited by examiner

*Primary Examiner* — Zakiya W Bates
(74) *Attorney, Agent, or Firm* — Stinson LLP

(57) ABSTRACT

Imidazoline-derived compounds are used in compositions and methods for inhibiting natural gas hydrate agglomerates. The imidazoline-derived compounds are reaction products between a tall oil fatty acid and an amine. The methods include introducing a composition downhole, the composition comprising an imidazoline-derived compound formed by reacting a tall oil fatty acid with an amine; and contacting the composition with a downhole fluid to inhibit formation of hydrate agglomerates, wherein the downhole fluid comprises natural gas or hydrocarbons.

14 Claims, 2 Drawing Sheets

IMIDAZOLINE-DERIVED COMPOUNDS AND USE AS NATURAL GAS HYDRATE INHIBITORS

CROSS REFERENCE TO RELATED APPLICATIONS

This application claims priority to U.S. Provisional Patent Application Ser. No. 63/044,087 filed on Jun. 25, 2020, the disclosure of which is incorporated herein by reference in its entirety.

FIELD

The application is directed at inhibiting or preventing the formation of natural gas hydrate agglomerates.

BACKGROUND

"Natural gas hydrates" is a term referring to ice-like solids that are formed from gas molecules and water dissolved within liquid petroleum products (liquid hydrocarbons) when the temperature of the liquid is lowered and/or pressure upon the liquid is increased. Under these conditions, water molecules can form cage-like structures around gas molecules such as carbon dioxide, hydrogen sulfide, methane, ethane, propane, butane and iso-butane, creating crystalline clathrate structures, also termed a "clathrate gas hydrates." The specific architecture of a cage structure can be one of several types (called type 1, type 2, type H), depending on the identity of the guest molecule(s).

Once formed, these crystalline cage structures tend to precipitate and settle out from the liquid, accumulating into large solid masses. Such masses that form in petroleum liquids such as oil obtained from a subterranean reservoir can travel in transporting pipelines, and potentially block or damage the pipelines, related equipment, or both. The damage resulting from a blockage can be costly because equipment and pipelines need to be repaired, and oil production and the safety of field workers can be adversely affected.

Petroleum liquid recovery and production commonly operate under high pumping speed and high pressure within processing and transportation pipelines, conditions particularly favorable for natural gas hydrate formation. Additionally, weather conditions in some field locations can cause a substantial drop in temperature during one or more production, transportation, and storage operations carried out during and after recovery of liquids obtained from subterranean reservoirs.

The industry uses a number of methods to prevent or reduce natural gas hydrate formation and its accompanying adverse effects. For example, natural gas hydrate inhibitors include thermodynamic gas hydrate inhibitors (THI), anti-agglomerant gas hydrate inhibitors (AAs), and kinetic gas hydrate inhibitors (KHIs). The amount of chemical needed to prevent blockages varies widely depending upon the inhibitor type employed. THIs are substances that can reduce the temperature at which the gas hydrates form at a given pressure and water content, and are typically dosed at 50% based on water content and as high as 100% of the volume of water. Therefore, there is a substantial cost associated with the transportation and storage of large quantities of these inhibitors. A more cost-effective alternative is the use of low dosage gas hydrate inhibitors (LDHIs), as they generally require a dose of less than about 2 volume percent to inhibit the nucleation or growth of gas hydrates. The two general types of LDHIs, KHIs and anti-agglomerants, typically are used at much lower concentrations.

KHIs work by delaying the growth of gas hydrate crystals. They also function as anti-nucleators. In contrast, AAs allow natural gas hydrates to form but prevent them from agglomerating and subsequently accumulating into larger masses capable of causing plugs. AAs function to keep natural gas hydrate crystals and agglomerates dispersed as a slurry within the liquid hydrocarbon.

While many inhibitors and dispersants have been developed for ameliorating the effects of natural gas hydrates within liquid petroleum products, there continues to be a need for new and effective compositions and methods of preventing or reducing natural gas hydrate agglomerate formation.

SUMMARY

Described herein are compositions and methods for inhibiting the formation of natural gas hydrate agglomerates in a fluid comprising water, gaseous molecules, and a liquid hydrocarbon.

In one aspect is a method of inhibiting formation of agglomerates of natural gas hydrates comprising: introducing into a fluid a composition comprising at least one imidazoline-derived compound to inhibit formation of agglomerates of natural gas hydrates, the at least one imidazoline-derived compound formed by a reaction between a tall oil fatty acid and an amine.

In another aspect is a composition comprising at least one imidazoline-derived compound to inhibit formation of natural gas hydrate agglomerates, the at least one imidazoline-derived compounds formed by a reaction between a tall oil fatty acid and an amine.

In still another aspect, the at least one imidazoline-derived compound has the general formula:

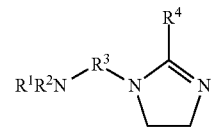

Wherein $R^4$ can be any combination of H, 1-30 carbon atoms, linear or branched, saturated or unsaturated carbon chains or 3-8 carbon atom rings (e.g. cyclopentyl, and the like) or carboxylic acid (amide) to C1-C20+ linear or branched, saturated or unsaturated carbon chains:

$R^1R^2$ can each be a C2 linker to a carboxylic acid or ester or can be a ring structure; and $R^3$ can be any C1-C10 linear or branched, saturated or unsaturated carbon chain linking the imidazoline ring to the free amine.

In still other aspects the imidazoline-derived compounds are used to inhibit agglomerates of natural gas hydrates.

DETAILED DESCRIPTION

Figure 1:
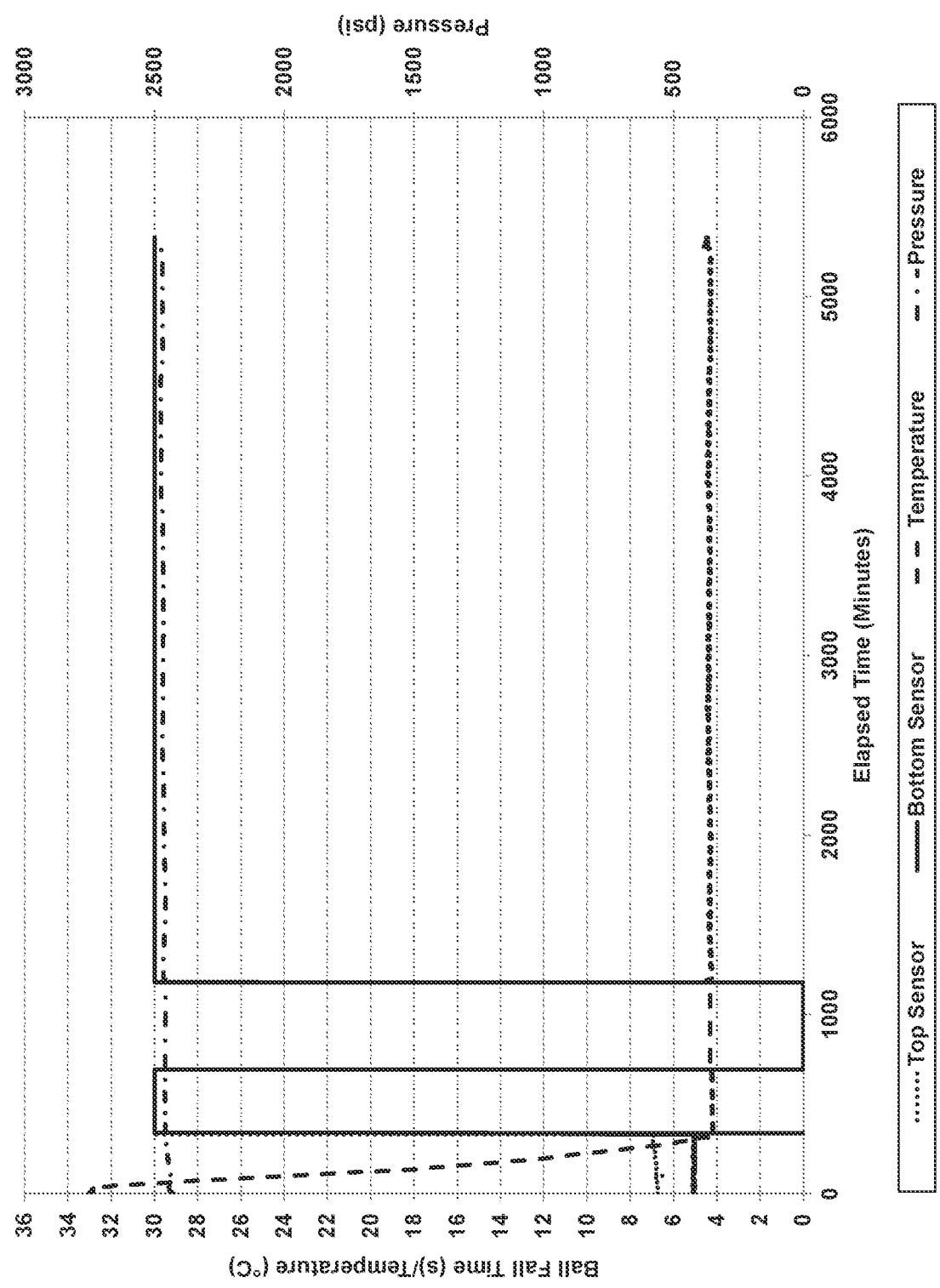
FIG. 1 is a graphical representation of cell pressure as a function of run time for an imidazoline-base molecule, in accordance with the present disclosure.

Although the present disclosure provides references to various embodiments, persons skilled in the art will recognize that changes may be made in form and detail without departing from the spirit and scope of the present application. Various embodiments will be described in detail with reference to the figures. Reference to various embodiments does not limit the scope of the claims attached hereto. Additionally, any examples set forth in this specification are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the present application. All publications, patent applications, patents and other references mentioned herein are incorporated by reference in their entirety.

As used herein, the term "alkyl" refers to a monovalent group derived by the removal of a single hydrogen atom from a straight or branched chain or cyclic saturated or unsaturated hydrocarbon containing from one to sixty carbon atoms.

As used herein, the term "anti-agglomerant" or "AA" refers to a compound that inhibits formation of agglomerates of natural gas hydrates. The term will be understood to refer to the AA itself or in a composition which may include other AAs or compounds or solvents, as determined by context.

As used herein, the term "fluid" means liquid, gas molecules, or both in an oil or natural gas well production operation.

As used herein, the term "inhibits," "inhibiting," or grammatical equivalents thereof refers to preventing, retarding, mitigating, reducing, controlling and/or delaying formation of gas hydrates and/or agglomerates of gas hydrates, and/or equipment/pipeline plugs formed from gas hydrate agglomerates.

As used herein, the terms "natural gas hydrates" or "gas hydrates" refers to a gaseous mixture in a water clathrate.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of" and includes "consisting of." "Consisting essentially of" and "consisting of" are construed as in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Described are imidazoline-derived compounds. These compounds are used in compositions and methods to inhibit formation of agglomerates of natural gas hydrates, and/or plugs formed from natural gas hydrate agglomerates within liquid hydrocarbon recovery, processing, transportation, and storage operations. The compositions may be applied to one or more liquid hydrocarbon products to inhibit plugging of annular spaces, such as pipes, transfer lines, valves, and the like, including equipment downhole where the conditions are conducive for the formation of gas hydrates.

In some embodiments, the imidazoline-derived compounds have the general structure shown below as Formula I

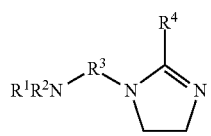

(Formula I)

In Formula I, $R^4$ can be any combination of H, 1-30 carbon atoms, linear or branched, saturated or unsaturated carbon chains or 3-8 carbon atom rings (e.g. cyclopentyl, and the like) or carboxylic acid (amide) to C1-C20-+ linear or branched, saturated or unsaturated carbon chains (see examples below). $R^1R^2$ each can be a C2 linker to a carboxylic acid or ester (Michael product, see examples below) or can be a ring structure. $R^3$ can be any C1-C10 linear or branched, saturated or unsaturated carbon chain linking the imidazoline ring to the free amine. $R^4$ can be any C1-C30+ carbon chain, either linear/branched/saturated/unsaturated (coming from corresponding carboxylic acid of choice). Common examples include stearic acid, oleic acid, or a series of mixed $R^3$ lengths tied to a mixture of acids, such as coconut oil, palm oil, and the like.

In some embodiments, the $R^1$ can have the ring structure as shown below as Formula II:

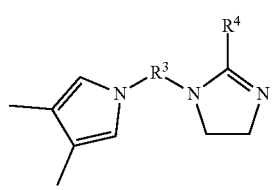

(Formula II)

The synthesis of the imidazoline-derived compounds can be prepared by any process known in the art. In some embodiments, imidazoline-derived compounds are prepared by first making an imidazoline base molecule, which is a reaction product of a tall oil fatty acid (TOFA) and a primary amine. In some embodiments the primary amine is a diamine or poly alkyl diamine. In some embodiments the primary amine is an ethylene diamine (EDA), diethylene triamine (DETA), triethylene tetraamine (TETA) or any amine containing an ethylene diamine and a 1-10 carbon atom spacer. In some embodiments, the imidazoline base molecule is prepared by reacting a tall oil fatty acid (TOFA) and diethylenetriamine (DETA), which results in Formula III as shown below:

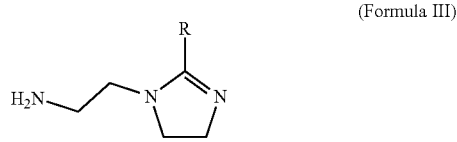

(Formula III)

To make the imidazoline base molecule, an appropriate reaction temperature from about 180° C. to about 225° C. is selected and stoichiometric amounts, for example 1:1 mole ratios of the TOFA and amine are reacted, although the molar ratio may be suitably varied between about 1.5:1 to 1:1.5. The reaction is carried out by contacting the components, optionally including heating the contacted components. Optionally, the combination of contacted components further includes one or more solvents. The contacting is continued until substantially complete, namely, the 1:1 amide reaction product of the TOFA and the primary amine is formed. The formation of the imidazoline base molecule is suitably verified using common analysis methods such as liquid chromatography, thin layer chromatography or othe spectroscopic methods. In some embodiments, the imidazoline base molecule reaction product is employed without further purification or other steps as an intermediate in the formation of the imidazoline-derived products.

In some embodiments, the primary amine site of the imidazoline base molecule (e.g. Formula III) is further reacted to form derivatives of the imidazoline base molecule (referred herein as imidazoline-derived compounds). In some embodiments, the imadazoline-derived compounds result from a reductive amination reaction of the primary amine of the imidazoline base molecule with aldehydes or ketones and a reducing agent. In other embodiments the primary amine of the imidazoline base molecule is amidated with carboxylic acids or esters such as with methyl esters. In still other embodiments, the primary amine of the imidazoline base molecule is reacted by a Michael addition with acrylates, acrylamides or other activated alkenes or Michael substrates.

In some embodiments, the imadazoline-derived compounds are as shown below:

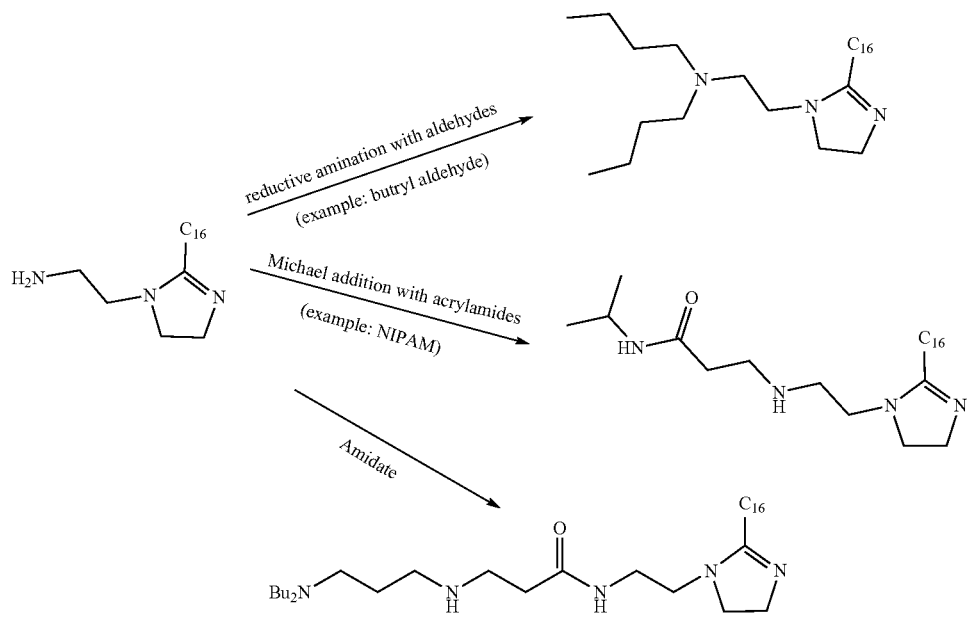

In some embodiments, the imidazoline-derived compound is produced by a reductive amination process with the primary amine of the imidazoline base molecule of Formula III and a ketone or aldehyde and a reducing agent. In some embodiments, two successive reductive aminations provide a tertiary amine from the primary amine.

In some embodiments the aldehyde is a saturated or unsaturated aliphatic aldehyde such as such as formaldehyde, acetaldehyde, propionaldehyde, butyl aldehyde, isobutyl aldehyde, and the like.

In some embodiments, the reducing agents are hydrogen in the presence of a catalyst; a hydride such as borohydride (BH4), Al Li H4, pyridine borane (PyBH3) or cyanoborohydride such as NaCNBH3. Borohydrides and cyanoborohydride allow for reaction in an aqueous medium.

In some embodiments, the primary amine of the imdazoline base molecule is further reacted by Michael addition to an alkene as a Michael acceptor resulting in the following Formula IV:

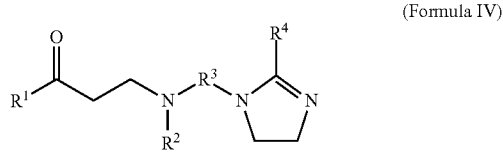

(Formula IV)

$R^1$ can be any combination of C1-C20+ linear or branched, saturated or unsaturated alkoxy amines chains (derived from acrylate or acrylamides thereof), or —OH (acrylic acid).

$R^2$ can be any combination of H, C1-C20+ linear or branched, saturated or unsaturated carbon chains or carboxylic acid (amide) to C1-C20+ linear or branched, saturated or unsaturated carbon chains or an additional Michael adduct such as $R^1$ or to acrylic acid.

$R^3$ can be any C1-C10 linear or branched, saturated or unsaturated carbon chain linking the imidazoline ring to the free amine.

$R^4$ can be any C1-C30+ carbon chain, either linear/branched/saturated/unsaturated (coming from corresponding carboxylic acid of choice). Common examples include stearic acid, oleic acid, or more likely a series of mixed $R^3$ lengths tied to a mixture of acids, such as coconut oil, palm oil, and the like.

The Michael addition reactions are between a primary amine-containing group (viz., an aromatic or aliphatic amines) and an unsaturated hydrocarbon moiety (e.g., C=C double bond) that is in proximity of an electron withdrawing group (EWG) such as carbonyl, cyano, or nitro. The Michael addition, generally, is a reaction between nucleophiles and olefin and alkene functionalities, wherein the nucleophile adds across a carbon-carbon multiple bond that is adjacent to an EWG and resonance stabilizing activating group, such as a carbonyl group. The Michael addition nucleophile is known as the "Michael donor," and the electrophilic olefin is known as the "Michael acceptor," and the resultant reaction product of the two components is known as the "Michael adduct" to result in the imidazoline-derived compound.

In some embodiments the "Michael acceptor" is an alkene or olefin. In some embodiments an alkenyl group is proximate to an electron-withdrawing group (EWG) such as, for example, e.g., carbonyl, nitrile, sulfone, nitro, phosphonate. In some embodiments, the EWG is a ketone, halo, carbonyl (—CO), nitro (—NO$_2$), nitrile (—CN), alkoxycarbonyl (—COOR), phosphonate (—PO(OR)$_2$), trifluoromethyl (—CF$_3$), sulfonyl (—SO$_2$—), trifluormethanesulfonyl (—SO$_2$CF$_3$), or p-toluenesulfony, (—SO$_2$—C$_6$H$_4$—CH$_3$). In some embodiments, the olefin is an α, β unsaturated compound such as ethylenic unsaturations between carbon atoms at the α and β positions relative (e.g. a carbonyl group.)

In some embodiments, a Michael acceptor group is a vinyl ketone, a vinyl sulfone, a quinone, an enamine, a ketimine, an aldimine, an oxazolidine, and an acrylate.

In some embodiments, Michael acceptors include acrylate esters, acrylonitrile, acrylamides, maleimides, alkyl methacrylates, cyanoacrylates, vinyl ketones, α,β-unsaturated aldehydes, vinyl phosphonates, acrylonitrile, vinyl pyridines, azo compounds, β-keto acetylenes, acetylene esters, nitro ethylenes, and the like.

In some embodiments, anionic olefins are acrylic acid, methacrylic acid, itaconic acid, maleic acid, vinylsulfonic acid, vinylphosphonic acid, 2-acrylamido-2-methylpropane sulfonic acid (AMPS), 3-(allyloxy)-2-hydroxypropane-1-sulfonate, and the like.

In some embodiments, cationic olefins are (3-acrylamidopropyl)trimethylammonium chloride (APTAC), [3-(Methacryloylamino)propyl]trimethylammonium chloride (MAPTAC), 2-(acryloyloxy)-N,N,N-trimethylethanaminium chloride (DMAEA-MCQ), N,N-dimethylaminoethyl acrylate benzyl chloride quaternary salt (DMAEA-BCQ), 2-(methacryloyloxy)-N,N,N-trimethylethan-1-aminium methyl sulfate (DMAEA-MSQ), 2-(acryloyloxy)-N,N,N-trimethylethanaminium chloride (DMAEA-MSQ), and the like.

In some embodiments, non-ionic olefins are 4-vinylpyridine, 2-vinylpyridine, acrylate esters, alkyl methacrylates, acrylonitrile, acrylamides, and the like.

In some embodiments the Michael acceptor are acrylamides and acrylates. In some embodiments, the acrylamides are dimethylaminopropylmethacrylamide (DMAPMA) which is made from methyl methacrylate (MMA) and dimethylaminopropylamine (DMAPA). In other embodiments the acrylamide is an N-isopropylacrylamide (NIPAM).

In some embodiments the acrylates or methacrylates and their esters are methyl acrylate, ethyl acrylate, methyl methacrylate and ethyl methacrylate, behenyl methacrylate, vinyl acetate, lauryl acrylate, and the like.

In some embodiments, the primary amine of the imidazoline base molecule is further amidated by reacting the primary amine of the imidazoline base molecule with a carboxylic acid or ester to result in an imadazoline-derived compound. In some embodiments the amidated imidazoline-derived compound has the general formula as shown as Formula V

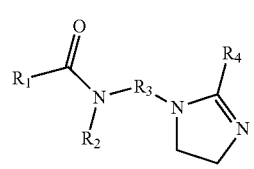

(Formula V)

Wherein, $R^1$ can be any combination of H, C1-C20+ linear or branched, saturated or unsaturated carbon chains or carboxylic acid (amide) to C1-C20+ linear or branched, saturated or unsaturated carbon chains. $R^2$ can be any combination of H, C1-C20+ linear or branched, saturated or unsaturated carbon chains or carboxylic acid (amide) to C1-C20+ linear or branched, saturated or unsaturated carbon chains. $R^3$ can be any C1-C10 linear or branched, saturated or unsaturated carbon chain linking the imidazoline ring to the free amine. $R^4$ can be any C1-C30+ carbon chain, either linear/branched/saturated/unsaturated (coming from corresponding carboxylic acid of choice). Common examples include stearic acid, oleic acid, or a series of mixed $R^3$ lengths tied to a mixture of acids, such as coconut oil, palm oil, and the like.

In some embodiments, the imidazoline-derived compounds can be a hydrogenated version thereof. In some embodiments, the imidazole (hydrogenated ring), is as shown in Formula VI:

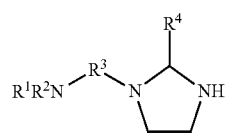

(Formula VI)

In some embodiments, the imidazoline-derived is any charged versions thereof. In some embodiments, the imidazolinium is as shown in Formula VII:

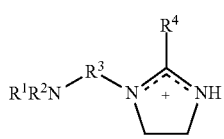

(Formula VII)

In some embodiments, the imidazoline/imidazole/imidazolinium ring is not just limited to C5, but is a 4-8 carbon atom containing compound. In some embodiments, the imidazoline is shown in Formula VIII.

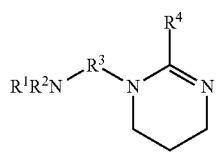

(Formula VIII)

The R groups for the formula VI, VII and VIII above are the same as described above for Formula I.

In some embodiments the imidazoline-derived compounds are:

From reductive amination:

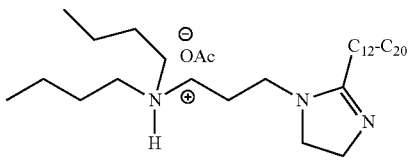

N,N-Dibutyl TOFA-imidazoline, acetic acid salt

-continued

From Michael addition:

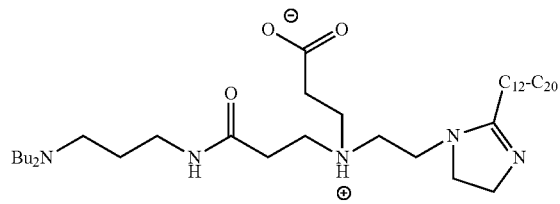

N-Dibutlaminopropylamidoethylene TOFA-imidazoline, acetic or acrylic acid salt

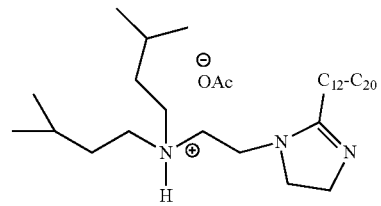

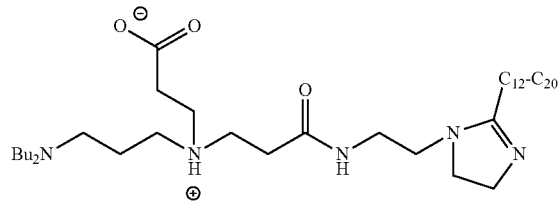

N-Amindoethylenyl dibutylaminopropylamine TOFA-imidazoline, acetic or acrylic acid salt In some embodiments the imidazoline-derived compounds comprise, consisting of, or consist essentially of 2-(2-TOFA-1-imidazolinyl)ethyl]dibutylamine, 3-[3-(dibutylamino) propylamino]-1-[2-(2-TOFA-1-imidazolinyl)ethylamino]-1-propanone, N-dibutylaminopropylamidoethylene TOFA-imidazoline, N-amidoethylenyl dibutylaminopropylamine TOFA-imidazoline, and salts thereof (e.g. acetic or acrylic acid salts).

In some embodiments, the amine is linear, branched, aromatic, or alkaromatic compounds having about 12 to 60 carbons. In some embodiments, the amine is a monoamine, diamine, polyamine or combination thereof. Examples of monoamines include ethylamine, dimethylamine, diethylamine, n-butylamine, dibutylamine, allylamine, isobutylamine, cocoamine, stearylamine, laurylamine, methyllaurylamine, oleylamine, N-methyl-octylamine, dodecyl-amine, diethanolamine, morpholine, and octadecyl amine.

In some embodiments, the amines are diamines, which can include aliphatic diamines, branched aliphatic diamines, cyclic diamines.

In some embodiments, the polyamines have the formula [$R^5$—NH—$R^6$], wherein $R^5$ and $R^6$ are a H or an alkyl group.

In some embodiments, the amine is a dibutylaminopropylenediamine:

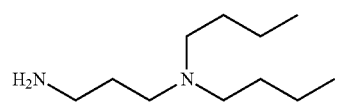

In some embodiments, the amine is a dibutylaminopropylenediamine with an additional aminopropylamine:

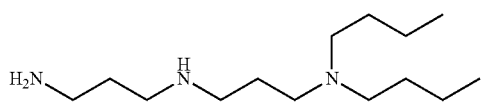 [SMILES: CCCCN(CCCC)CCCNCCCN]

In some embodiments, the amine is an aminopropyl pyrrolidine:

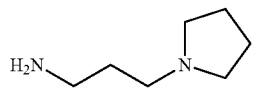

In some embodiments, the amine is an aminopropyl azepane:

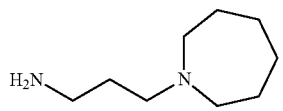 [SMILES: NCCCN1CCCCCC1]

In some embodiments the amine is a polyamine. In other embodiments the poly amines are polyalkylene polyamines of about 2 to 60, 2 to 40, 3 to 20 total carbon atoms and about 1 to 12, 3 to 12, 5 to 9 nitrogen atoms in the molecule.

In some embodiments, amines are hydrocarbyl amines or hydrocarbyl amines including other groups, e.g., hydroxy groups, alkoxy groups, amide groups, nitriles, imidazoline groups, and the like. Hydroxy amines with 1 to 6 hydroxy groups or 1 to 3 hydroxy groups are useful.

In some embodiments, amines are aliphatic saturated amines, including those of the general formulas:

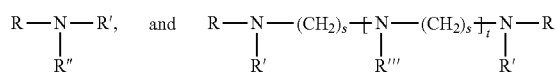

wherein R, R', R" and R'" are independently selected from a group of hydrogen; 1 to 25 carbon straight or branched chain alkyl radicals; 1 to 12 carbon alkoxy, 2 to 6 carbon alkylene radicals; 2 to 12 carbon hydroxy amino alkylene radicals; and 1 to 12 carbon alkylamino, 2 to 6 carbon alkylene radicals; and wherein R'" can additionally comprise a moiety of the formula:

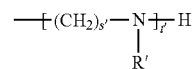

wherein R' is as defined above, and wherein s and s' can be the same or a different number of from 2 to 6, 2 to 4; and t and t' can be the same or different and are numbers of from 0 to 10, 2 to 7, or about 3 to 7, with the proviso that the sum of t and t' is not greater than 15.

In some embodiments, exemplary amine compounds include: 1,2-diaminoethane; 1,3-diaminopropane; 1,4-diaminobutane; 1,6-diaminohexane: polyethylene amines such as diethylene triamine (DETA); triethylene tetramine (TETA); tetraethylene pentamine; (TEPA) polypropylene amines such as 1,2-propylene diamine; di-(1,2-propylene) triamine; di-(1,3-propylene)triamine; N,N-dimethyl-1,3-diaminopropane; N,N-di-(2-aminoethyl) ethylene diamine; N,N-di(2-hydroxyethy 1)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl) morpholine; and mixtures thereof.

In some embodiments the polyamines are DETA, triethylentetramine (TETA) or any amine containing an ethylene diamine and a 1-10 carbon atom spacer:

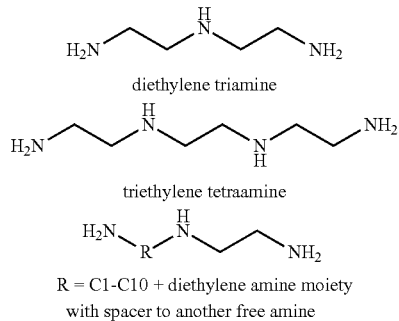

In some embodiments the "tall oil fatty acid" or "TOFA" refers to a combination of mono- or polyunsaturated long-chain carboxylic acids derived from sources comprising, consisting essentially of, or consisting of "tall oil". "Tall oil" is a term of art for the by-product obtained from a Kraft process of wood pulp manufacture, most commonly from pulping coniferous trees. In the Kraft Process, high alkalinity and temperature converts the esters and carboxylic acids in tree rosin into soluble sodium salts thereof that are referred to as "soaps". The soaps are collected, then heated and acidified with sulfuric acid to recreate the free acids; this product is referred to as crude tall oil (CTO). Fractional distillation of CTO yields the product known in the industry as TOFA.

TOFA is an industrially useful material that is derived from natural sources and therefore in some embodiments includes more than one species of fatty acid. In some embodiments, both the type and amount of different fatty acids in a TOFA material vary between batches. Thus, both TOFA and any reaction products thereof as described herein represent a range of chemical species. Since TOFA is derived from natural materials, TOFA and derivatives thereof as discussed herein have a compositional range that varies based on the specific trees from which the tall oil product is initially obtained as well as the extent of subsequent processing thereof, particularly the fractionation of CTO. In some embodiments, the major component (50% or more by weight) of TOFA is oleic acid ((9Z)-octadec-9-enoic acid, $CH_3(CH_2)_7CH=CH(CH_2)_7COOH$). In some embodiments, the TOFA is predominantly oleic acid (C18 w/1 unit of unsaturation). In other embodiments TOFA is many different chain lengths and groups, such as from C10-C20 with an average of one unsaturation, 1-3, or more than 3.

In some embodiments the long chain fatty acid is TOFA, which refers to a distilled product derived from trees and which consists of a mixture of fatty acids, C17H31-35 CO2H with a CAS No. 61790-12-3. It is a mixture of oleic acid as a major component, linoleic acid and saturated fatty acids. In another embodiment, TOFA refers to tall oil fatty acid stock and typically includes about 1% palmitic acid; about 2% stearic acid; about 48% oleic acid; about 35% linoleic acid; about 7% conjugated linoleic acid ($CH_3(CH_2)_xCH=CHCH=CH(CH_2)_yCOOH$, where x is generally 4 or 5, y is usually 7 or 8, and X+Y is 12); about 4% other acids, such as 5,9,12-octadecatrienoic acid, linolenic acid, 5,11,14-eicosatrenoic acid, cis, cis-5,9-octadecadienoic acid, eicosadienoic acid, elaidic acid, cis-11 octadecanoic acid, and C-20, C-22, C-24 saturated acids; and about 2% unsaponifiable matter. In other embodiments, TOFA includes any suitable tall oil fatty acid or mixture known in the art or equivalents thereof.

In some embodiments, the TOFA contains from about 1 to about 30 carbon atoms or mixtures thereof. For example, the fatty acid may be selected from the group consisting of caproic acid, caprylic acid, lauric acid, oleic and stearic acid.

In some embodiments, where an acidification step is of a secondary or tertiary amine, the acidification is generally achieved through the addition of an organic acid. Exemplary organic acids include acetic acid or acrylic acid. In other embodiments, the acrylic acid reactions with any residual primary or secondary amines (reversibly with tertiary amines) to yield a carboxybetaine structure. Other organic acids may be used for this acidification, including pivalic acid, malic acid, maleic acid, succinic acid, and any C1-C12+ carboxylic acids. Inorganic acids can also be used, such as common mineral acids (hydrochloric acid, phosphoric acid, nitric acid, carbonic acid) or related, as well as Lewis acids (tetrafluoroborate, aluminum trichloride, or the like).

The compositions and methods described herein are used to inhibit formation of agglomerates of gas hydrates, and plugging during liquid hydrocarbon production and transportation. In some embodiments, compositions comprise, consist of or consist essentially of at least one of the described imidazoline-derived compounds. In some embodiments, the composition can further comprise one or more thermodynamic gas hydrate inhibitors, one or more kinetic gas hydrate inhibitors, one or more other anti agglomerants, or any combination thereof. In some embodiments, the composition can include other additives such as one or more asphaltene inhibitors, paraffin inhibitors, corrosion inhibitors, scale inhibitors, emulsifiers, demulsifies, water clarifiers, dispersants, emulsion breakers, or any combination thereof.

The composition comprising the imidazoline-derived compounds is prepared or formulated in one or more solvents, depending upon the application and requirements. In some embodiments, suitable solvents for formulation with the imidazoline-derived composition includes water, brine, seawater, alcohols such as methanol, ethanol, isopropanol, n-propanol, n-butanol, isobutanol, sec-butanol, t-butanol or higher alcohols such as benzyl alcohol); ketones such as acetone, or methyl ethyl ketone (2-butanone); acetonitrile; esters such as ethyl acetate, propyl acetate and butyl acetate; ethers such as diethyl ether or higher, e.g. methyl t-butyl ether, glyme, diglyme, ethylene glycol monobutyl ether, ethylene diglycol ethyl ether, 1,4 dioxane and related glycols; aromatics such as toluene, xylene(s), diethylbenzene, naphthalene and related aromatics or refinery cuts (heavy aromatic naphtha, heavy aromatic distillates, and related); aliphatics such as pentane, hexane, heptane, octane, or refined gasoline, or several "green" solvents such as 2-methyltetrahydrofuran, furfural alcohol, and cyclopentylmethylether.

In some embodiments, other solvents suitable for formulation with the imidazoline-derived compound include aliphatics, such as pentane, hexane, cyclohexane, methylcyclohexane, heptane, decane, dodecane, diesel, and the like, and aromatics, such as toluene, xylene, heavy aromatic naphtha, fatty acid derivatives (acids, esters, amides), and the like.

In some embodiments, the imidazoline-derived compound is formulated in a composition with an amount from about 1-80 w/v %. In some embodiments, the imidazoline-derived compound is added in an amount from about 1-10 w/v %, 10-20 w/v %, 20-60 w/v %, 45-60 w/v %, 60-80 w/v %, or 1-60 w/v %.

In some embodiments, the composition comprising the imidazoline-derived compound is used in a method of inhibiting the formation of natural gas hydrate agglomerants. The method comprises adding to a fluid an amount of a composition comprising one or more imidazoline-derived compounds. In some embodiments, the fluid comprises water, gas molecules, and liquid hydrocarbon.

In some embodiments, the composition comprising, consisting of, or consisting essentially of the imidazoline-derived compound may be introduced by any method suitable for ensuring dispersal of the imidazoline-derived compound through the liquid being treated. In some embodiments, the imidazoline-derived compound may be injected prior to substantial formation of gas hydrates.

In some embodiments, the imidazoline-derived compound is introduced into fluid contained in an oil and gas pipeline. In other embodiments, the imidazoline-derived compound is added to fluid contained in refineries, such as separation vessels, dehydration units, gas lines, and pipelines. In some embodiments, the imidazoline-derived compounds are introduced into a fluid using various well-known methods and they may be introduced at numerous, different locations throughout a given system. In other embodiments, the composition comprising, consisting of, or consisting essentially of the one or more imidazoline-derived compound is injected using mechanical equipment such as chemical injection pumps, piping tees, injection fittings, and the like.

An exemplary application point for the petroleum liquid production operations is near the surface controlled sub-sea safety valve. In some embodiments, application or introduction of the imidazoline-derived compound occurs downhole. This ensures that during a shut-in, the composition is able to disperse throughout the area where natural gas hydrates will occur. Application of the imidazoline-derived compounds can also occur at other areas in the flowline, taking into account the density of the injected liquid. If the injection point is well above the gas hydrate formation depth, then the imidazoline-derived compound may be formulated with a solvent having a density high enough that the imidazoline-derived compound will sink in the flowline to collect at the water/oil interface. In some embodiments, application is also used in pipelines or anywhere in the system where the potential for agglomerates of gas hydrate formation exists.

In some embodiments, various dosage amounts of the imidazoline-derived compound or compositions containing them are introduced to the fluid to inhibit the formation of gas hydrate agglomerants. One of ordinary skill in the art is able to calculate the amount of a composition comprising the imidazoline-derived compound for a given situation without undue experimentation. Factors that would be considered important in such calculations include, for example, content of fluid, percentage water cut. API gravity of hydrocarbon. In some embodiments, the imidazoline-derived compound alone or in a composition is introduced into a fluid to be treated from about 1000 ppm to about 50,000 ppm, from about 2000 ppm to about 15,000 ppm, or 3000 ppm to 20,000 ppm.

The composition and methods are useful for inhibiting gas hydrate agglomerate formation for many hydrocarbons and hydrocarbon mixtures. The compositions are particularly useful for lighter or low-boiling, 1-5 carbon containing hydrocarbon gases or gas mixtures at ambient conditions. In some embodiments, the gases are methane, ethane, propane, n-butane, isobutane, isopentane, and mixtures thereof. In other embodiments, natural gas mixtures are present in many gas and/or oil formations and natural gas liquids. The hydrocarbons may also comprise other compounds including, but not limited to, carbon dioxide, hydrogen sulfide, and other compounds commonly found in gas/oil formations or processing plants, either naturally occurring and/or used in recovering/processing hydrocarbons from the formation, and mixtures thereof.

In some embodiments, the compositions and methods are useful for inhibiting gas hydrate formation in a variety of black oils, heavy black oils to condensates, from API 20-50. In some embodiments, the compositions and methods are useful for inhibiting gas hydrate formation in paraffinic or asphaltenic oils. In such embodiments, paraffin or asphaltene inhibitors are used in conjunction with the imidazoline-derived compound.

In some embodiments, the composition comprising, consisting of, or consisting essentially of the imidazoline-derived compound is applied to fluids that containing various levels of oil, brine or both having various levels of salinity. In some embodiments, the fluid has a salinity of about 0.1% to about 25% or about 10% to about 25% weight/weight (w/w).

In some embodiments, the composition comprising the imidazoline-derived compound is applied to a fluid that contains various levels of water cut. One of ordinary skill in the art understands that "water cut" refers to the percent of water in a composition containing an oil and water mixture. In one embodiment, the water cut is from about 1% to about 80% w/w with respect to the hydrocarbon phase. In other embodiments, the water cut is from about 1% to about 30% w/w, from about 5% to about 40% w/w, from about 10% to about 60% w/w, from about 15% to about 80% w/w, from about 20% to about 60% w/w, with respect to the hydrocarbon phase.

The methods can be used at any pressure that results in hydrocarbon gas hydrates. When the hydrocarbons in the mixture are lower boiling hydrocarbons or hydrocarbon gases at ambient conditions, the pressure is usually at or greater than atmospheric pressure (e.g., about 101 kPa), greater than about 1 MPa, or greater than about 5 MPa. The pressure in certain formation or processing units or plants could be much higher, such as grater than about 20 MPa. There is no specific high-pressure limit.

The imidazoline-derived compounds are mixed or blended with mechanical mixing equipment or devices, stationary mixing setup or equipment, magnetic mixing or other suitable methods, to provide adequate contact and/or dispersion of the composition into the mixture. The introducing of the imidazoline-derived compound can be made in-line and/or offline. The various components of the composition may be mixed prior to and/or during introduction. One of skill will understand that the methods disclosed herein are not limited in any way by the timing or location of the introducing.

EXAMPLES

The following examples are intended to illustrate different aspects and embodiments and are not to be considered limiting the scope of the present application. It will be recognized that various modifications and changes may be made without following the experimental embodiments described herein, and without departing from the scope of the claims.

Example 1—Preparation of Tall Oil Fatty Acid Amide Product (Imidazoline Base Molecule)

Tall oil fatty acid (TOFA) obtained from Ingevity was combined with diethylene triamine (DETA) in a 1:1 molar ratio based on the manufacturer's reported molecular weight of TOFA of 280 g/mol. The combination resulted in formation of a tall oil fatty amide product, 2-(2-TOFA-1-imidazolinyl)ethylamine. The completed reaction was as verified by FTIR spectroscopy. The tall oil fatty amide (TOFAm) product was calculated to have a molecular weight of 366 g/mol based on the manufacturer's reported molecular weight of TOFA.

Example 2 Preparation of [2-(2-TOFA-1-imidazolinyl)ethyl]dibutylamine 7.5 g (1.0 equivalents) of TOFAm product from Example 1 was mixed with 3.36 g (2.1 equivalents) of butyl aldehyde and 30 mL of dichloromethane in a roundbottom flask equipped with stir bar. A slight exotherm was noted. After exotherm stopped, 9.89 g (2.11 equivalents) of sodium triacetoxyborohydride (STAB) was added to flask contents and stirred overnight. Dichloromethane was stripped via rotary evaporation, yielding a waxy amber solid. 1.46 g of the final product was diluted in 5:1 methanol:benzyl alcohol (0.920 g:0.184 g) along with 0.195 g of acetic acid.

Example 3

The rocking cell test was used to determine if the imidazoline-derived compounds are able to minimize gas hydrate agglomerant particles and disperse those particles into a hydrocarbon phase.

The rocking cell includes a rack on which individual cells are placed. Each individual cell includes a sapphire tubing containing a stainless steel ball inside the sapphire tubing. The stainless steel ball induces turbulence and mixes the liquids during the rocking process. The sapphire tubing can also withstand pressures up to about 5,000 psi. Once the cells are mounted onto the rack, the rack rocks up and down slowly, at a rate of about 1 complete cycle (up and down) per minute. The rack is further contained within a temperature controlled bath attached to a chiller.

The compositions include a hydrocarbon, an aqueous phase, a gas and the imidazoline-derived compound tested. The aqueous phase used was a brine of about 4% salinity and a water content of 55% of the composition. Various crude oils such as black oil, heavy black oil and condensate were tested. A synthetic gas (~85% methane synthetic blend, which is a Type II gas hydrate forming gas blend) was used to pressurize the cells at the appropriate pressure. 2500 psi for the black oil and heavy black oil conditions, and 2000 psi for condensate.

Injected first into each cell was the brine and the gas. The imidazoline-derived compound was then dosed according to the brine amount in the test cell. The crude oil was heated to 60° C. for a minimum of 2 hours prior, then introduced into the cell containing the brine, gas, and the imidazoline-derived compound.

The cells with the test compositions were then equilibrated to a temperature of about 29° C., 2500 psi while rocking for 30 minutes.

The test is a constant pressure test where the cells are left open to a booster that boosts additional gas into the cells as gas was solubilized into the liquids and/or formed gas hydrates. The cells were rocked for about 30 minutes to equilibrate and mix prior to stopping at a horizontal position (shut-in). In the shut-in phase, the cells were cooled down to about 4.4° C. over approximately four hours and when the cells reached 4.4° C., they were rocked for an additional eight hours at 4.4° C. After a shut-in time of about 8 hours, the rocking of the cells was restarted for two hours. After two hours the cells were visually observed and ranked as pass/fail.

The pass/fail criteria were based on the ability of the ball in the rocking cell to move within the sapphire tube. For example, an imidazoline-derived compound tested was considered effective and passed the rocking cell test if at the time of the ranking, the ball moved freely when the cell was rocked indicating that few agglomerates were formed. In contrast, an imidazoline-derived compound failed if the ball's movement was obstructed or completely stopped by the formation of gas hydrate agglomerates. The anti-agglomerate's performance was considered borderline when there was observable gas hydrate agglomerates and at least some of the agglomerates stuck to the walls of the sapphire tube; when these agglomerates were present and the movement of the ball was not restricted, the imidazoline-derived compound ranking was considered borderline pass.

FIG. 1 shows the results for the imidazoline base molecule (2-(2-TOFA-1-imidazolinyl)ethylamine) as failing the rocking cell dosed at 3% with 55% water cut and 4% salinity in black oil.

Figure 2:
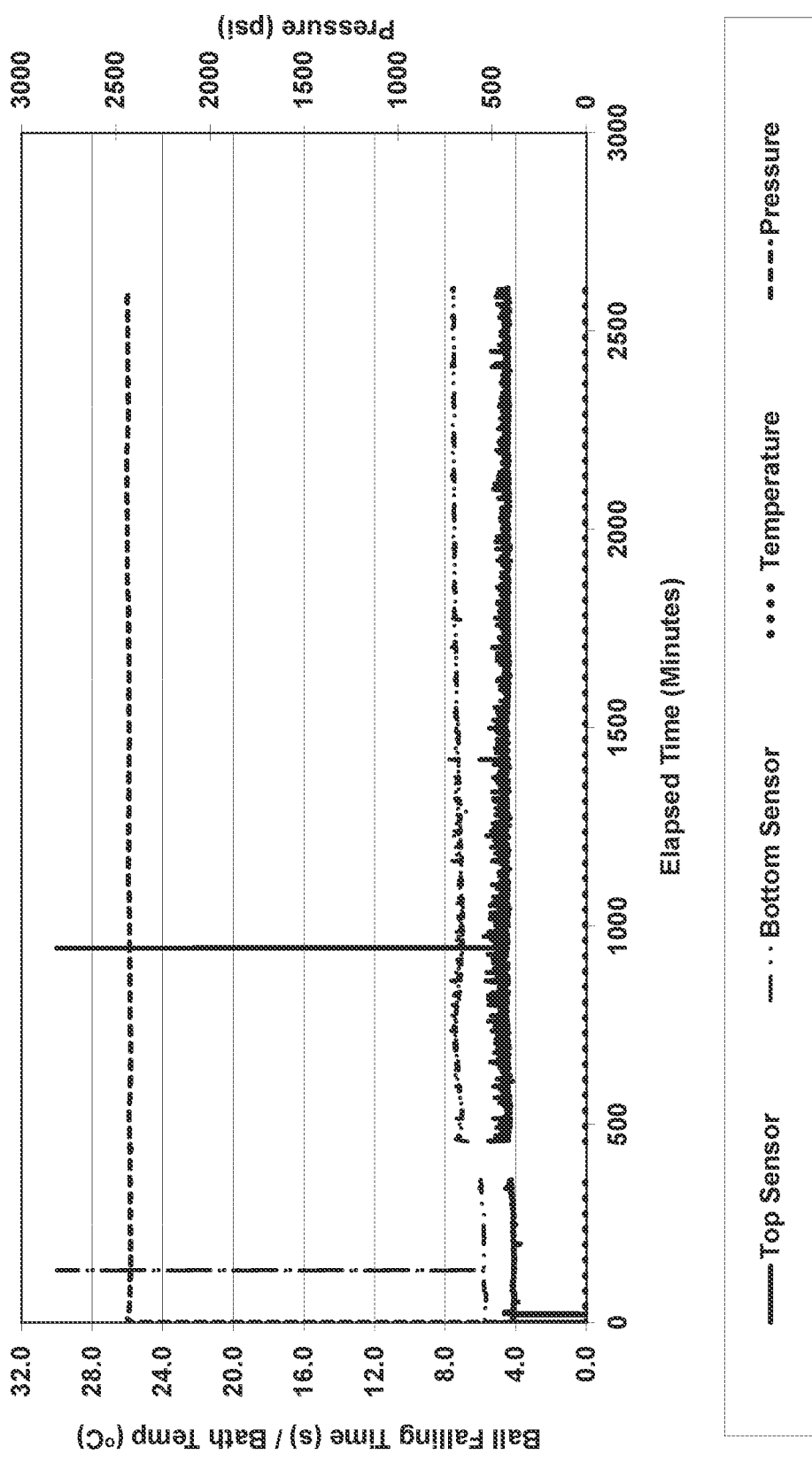
FIG. 2 is a graphical representation of cell pressure as a function of run time for an embodiment of the present disclosure.

FIG. 2 shows the results for an imidazoline-derived compound (reductive amination reaction between the imidazoline base compound and butyryl aldehyde and a reducing agent, 2-(2-TOFA-1-imidazolinyl)ethyl]dibutylamine) as passing the rocking cell dosed at 3% with 55% water cut and 4% salinity in black oil.

Some additional non-limiting embodiments are provided below to further exemplify the present disclosure:

Embodiment 1

A method of inhibiting formation of natural gas hydrates agglomerates, the method comprising: introducing into a fluid a composition comprising an imidazoline-derived compound to inhibit formation of natural gas hydrates agglomerates, the imidazoline-derived compound formed by a reaction between a tall oil fatty acid and an amine.

Embodiment 2

The method of embodiment 1, wherein introducing is by injecting or pumping.

Embodiment 3

The method as in one of embodiments 1-2, wherein introducing is into a downhole.

Embodiment 4

The method as in one of embodiments 1-3, wherein the fluid is contained in an oil or natural gas production operation or pipeline.

Embodiment 5

The method as in one of embodiments 1-4, wherein the fluid comprises water, natural gas, and liquid hydrocarbon.

Embodiment 6

The method as in one of embodiments 1-5, wherein the fluid comprises water of about 1% to about 80% weight/weight with respect to a hydrocarbon phase.

Embodiment 7

The method as in one of embodiments 1-6, wherein the composition further comprises one or more thermodynamic gas hydrate inhibitors, kinetic gas hydrate inhibitors, anti-agglomerants, asphaltene inhibitors, paraffin inhibitors, scale inhibitors, corrosion inhibitors, emulsifiers, water clarifiers, dispersants, emulsion breakers, or any combination thereof.

Embodiment 8

The method as in one of embodiments 1-7, wherein the imidazoline-derived compounds have the general formula:

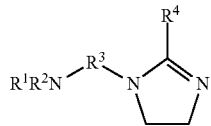

Wherein R4 can be any combination of H, 1-30 carbon atoms, linear or branched, saturated or unsaturated carbon chains or 3-8 carbon atom rings (e.g. cyclopentyl, and the like) or carboxylic acid (amide) to C1-C20+ linear or branched, saturated or unsaturated carbon chains;

R1 R2 can each be a C2 linker to a carboxylic acid or ester or can be a ring structure; and R3 can be any C1-C10 linear or branched, saturated or unsaturated carbon chain linking the imidazoline ring to the free amine.

Embodiment 9

The method as in one of embodiments 1-8, wherein the amine comprises primary, secondary or tertiary amine.

Embodiment 10

The method as in one of embodiments 1-9, wherein the amine comprises a polyamine.

Embodiment 11

The method as in one of embodiments 1-10, wherein the polyamine comprises a polyalkyl amine.

Embodiment 12

The method as in one of embodiments 1-11, wherein the polyalkyl amine comprises diethylene triamine, triethylene tetramine or mixtures thereof.

Embodiment 13

The method of embodiment 1-12 wherein the TOFA comprises stearic acid, oleic acid, or a mixture of fatty acids.

Embodiment 14

The method as in one of embodiments 1-13, wherein, the imidazoline-derived compounds comprises 2-(2-TOFA-1-imidazolinyl)ethyl]dibutylamine, 3-[3-(dibutylamino)propylamino]-1-[2-(2-TOFA-1-imidazolinyl)ethylamino]-1-propanone, N-dibutylaminopropylamidoethylene TOFA-imidazoline, N-amidoethylenyl dibutylaminopropylamine TOFA-imidazoline, and salts thereof.

Embodiment 15

A composition comprising at least one imidazoline-derived compound to inhibit formation of natural gas hydrate agglomerates, the at least one imidazoline-derived compounds formed by a reaction between a tall oil fatty acid and an amine.

Embodiment 16

The composition of embodiment 15, wherein the imidazoline-derived compounds have the general formula:

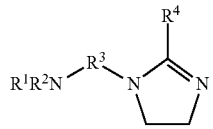

Wherein R4 can be any combination of H, 1-30 carbon atoms, linear or branched, saturated or unsaturated carbon chains or 3-8 carbon atom rings (e.g. cyclopentyl, and the like) or carboxylic acid (amide) to C1-C20+ linear or branched, saturated or unsaturated carbon chains;

R1R2 can each be a C2 linker to a carboxylic acid or ester or R1 can be a ring structure; and R3 can be any C1-C10 linear or branched, saturated or unsaturated carbon chain linking the imidazoline ring to the free amine.

Embodiment 17

The composition of embodiment 15, wherein the amine comprises a polyamine.

Embodiment 18

The composition as in one of embodiments 15-17, wherein the polyamine comprises a polyalkyl amine.

Embodiment 19

The composition as in one of embodiments 15-18, wherein the polyalkyl amine comprises diethylene triamine, triethylene tetramine or mixtures thereof.

Embodiment 20

The composition of embodiment 15-19 wherein the TOFA comprises stearic acid, oleic acid, or a mixture of fatty acids.

Embodiment 21

The composition as in one of embodiments 15-20, wherein the imidazoline-derived compounds comprises wherein, the imidazoline-derived compounds comprises 2-(2-TOFA-1-imidazolinyl)ethyl]dibutylamine, 3-[3-(dibutylamino)propylamino]-1-[2-(2-TOFA-1-imidazolinyl)ethylamino]-1-propanone, N-dibutylaminopropylamidoethylene TOFA-imidazoline, N-amidoethylenyl dibutylaminopropylamine TOFA-imidazoline, and salts thereof.

Embodiment 22

The composition as in one of embodiments 15-21, wherein imidazoline-derived compounds is from about 1 wt/v % to about 80 wt/v % based on the composition.

Embodiment 23

The composition as in one of embodiments 15-22, wherein the composition further comprises one or more thermodynamic gas hydrate inhibitors, kinetic gas hydrate inhibitors, anti-agglomerants, asphaltene inhibitors, paraffin inhibitors, scale inhibitors, emulsifiers, water clarifiers, dispersants, emulsion breakers, or any combination thereof.

Embodiment 24

The composition as in one of embodiments 15-23, wherein the imidazoline-derived compounds are about is about 1000 ppm to 50,000 ppm.

Embodiment 25

A composition comprising: a fluid; and the imidazoline-derived compounds as in one of embodiments 15-24.

Embodiment 26

The composition of embodiment 25, wherein the fluid comprises water, natural gas, and liquid hydrocarbon.

Embodiment 27

Use of the imidazoline-derived compound as in one of embodiments 1-26 to inhibit agglomerates of natural gas hydrates.

What is claimed is:

1. A method comprising:
   introducing a composition downhole, the composition comprising an imidazoline-derived compound; and
   contacting the composition with a downhole fluid to inhibit formation of hydrate agglomerates, wherein the downhole fluid comprises natural gas or hydrocarbons, wherein formation of hydrate agglomerates in the downhole fluid is inhibited, and wherein the imidazoline-derived compound has the formula I or VIII::

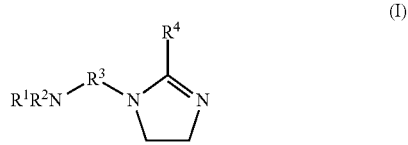
(I)

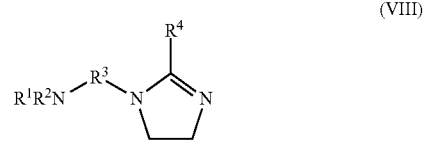
(VIII)

wherein $R^4$ is $C_1$-$C_{30}$ carbon chain (linear or branched, saturated or unsaturated), $C_3$-$C_8$ cycloalkyl, carboxylate, or amidate;

$R^1$ and $R^2$ are independently a $C_2$ linker to a carboxylic acid, ester, amide, or a ring structure; $R^1$ is hydrogen or $C_1$-$C_4$ alkyl and $R^2$ is $C_1$-$C_4$ alkyl; or $R^1$ is hydrogen or —C(O)—(CH$_2$)n-NH—(CH$_2$)$_3$—N(butyl)$_2$ and $R^2$ is —C(O)—(CH$_2$)n-NH—(CH$_2$)$_3$—N(butyl)$_2$; or $R^1$ is hydrogen or —(CH$_2$)$_3$—C(O)—NH—(CH$_2$)$_3$—N(butyl)$_2$ and $R^2$ is —(CH$_2$)$_3$—C(O)—NH—(CH$_2$)$_3$—N(butyl)$_2$; and $R^3$ is $C_1$-$C_{10}$ linear or branched, saturated or unsaturated carbon chain linking the imidazoline ring to the nitrogen atom.

2. The method of claim 1, wherein introducing is by injecting or pumping.

3. The method of claim 1, wherein the fluid is contained in an oil or natural gas production operation or pipeline.

4. The method of claim 1, wherein the fluid comprises water, natural gas, and liquid hydrocarbon.

5. The method of claim 1, wherein the fluid comprises water of about 1% to about 80% weight/weight with respect to a hydrocarbon phase.

6. The method of claim 1, wherein the composition further comprises one or more thermodynamic gas hydrate inhibitors, kinetic gas hydrate inhibitors, anti-agglomerants, asphaltene inhibitors, paraffin inhibitors, scale inhibitors, corrosion inhibitors, emulsifiers, water clarifiers, dispersants, emulsion breakers, or any combination thereof.

7. The method of claim 1, wherein $R^4$ is derived from stearic acid, oleic acid, or a mixture of fatty acids.

8. The method of claim 1, wherein, the imidazoline-derived compound comprises 2-(2-TOFA-1-imidazolinyl) ethyl]dibutylamine, 3-[3-(dibutylamino) propylamino]-1-[2-(2-TOFA-1-imidazolinyl)ethylamino]-1-propanone, N-dibutylaminopropylamidoethylene TOFA-imidazoline, N-amidoethylenyl dibutylaminopropylamine TOFA-imidazoline, and salts thereof.

9. A composition comprising at least one imidazoline-derived compound to inhibit formation of natural gas hydrate agglomerates, the at least one imidazoline-derived compound, has the formula I or VIII:

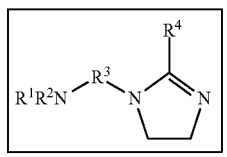 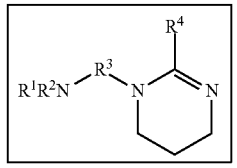 (VIII)

wherein $R^4$ is $C_1$-$C_{30}$ carbon chain (linear or branched, saturated or unsaturated), $C_3$-$C_8$ cycloalkyl, carboxylate, or amidate;

$R^1$ and $R^2$ are independently a $C_2$ linker to a carboxylic acid, ester, amide, or a ring structure; $R^1$ is hydrogen or $C_1$-$C_4$ alkyl and $R^2$ is $C_1$-$C_4$ alkyl; or $R^1$ is hydrogen or —C(O)—(CH$_2$)n-NH—(CH$_2$)$_3$—N(butyl)$_2$ and $R^2$ is —C(O)—(CH$_2$)n-NH—(CH$_2$)$_3$—N(butyl)$_2$; or $R^1$ is hydrogen or —(CH$_2$)$_3$—C(O)—NH—(CH$_2$)$_3$—N(butyl)$_2$ and $R^2$ is —(CH$_2$)$_3$—C(O)—NH—(CH$_2$)$_3$—N(butyl)$_2$; and $R^3$ is $C_1$-$C_{10}$ linear or branched, saturated or unsaturated carbon chain linking the imidazoline ring to the nitrogen atom.

10. The composition of claim 9, wherein $R^4$ is derived from stearic acid, oleic acid, or a mixture of fatty acids.

11. The composition of claim 9, wherein the at least one imidazoline-derived compound comprises 2-(2-TOFA-1-imidazolinyl)ethyl]dibutylamine, 3-[3-(dibutylamino) propylamino]-1-[2-(2-TOFA-1-imidazolinyl)ethylamino]-1-propanone, N-dibutylaminopropylamidoethylene TOFA-imidazoline, N-amidoethylenyl dibutylaminopropylamine TOFA-imidazoline, and salts thereof.

12. The composition of claim 9, wherein concentration of the one or more imidazoline-derived compound is from about 1 wt/v % to about 80 wt/v % based on the total weight of the composition.

13. The composition of claim 9, wherein the composition further comprises one or more thermodynamic gas hydrate inhibitors, kinetic gas hydrate inhibitors, anti-agglomerants, asphaltene inhibitors, paraffin inhibitors, scale inhibitors, emulsifiers, water clarifiers, dispersants, emulsion breakers, or a combination thereof.

14. The composition of claim 9, wherein concentration of the one or more imidazoline-derived compound is 1000 ppm to 50,000 ppm.

* * * * *